United States Patent [19]

Duwel

[11] Patent Number: 4,628,476

[45] Date of Patent: Dec. 9, 1986

[54] COMPLETING AN INCOMPLETE TRIP IN AN ELECTRONIC POSTAGE METER

[75] Inventor: Edward C. Duwel, Trumbull, Conn.

[73] Assignee: Pitney Bowes Inc., Stamford, Conn.

[21] Appl. No.: 447,918

[22] Filed: Dec. 8, 1982

[51] Int. Cl.[4] .............................................. G06F 15/20

[52] U.S. Cl. .................................... 364/900; 235/101; 364/464

[58] Field of Search ................ 364/464, 900; 235/101, 235/432

[56] References Cited

U.S. PATENT DOCUMENTS 4,410,961 10/1983 Dlugos et al. ...................... 364/900

*Primary Examiner*—Felix D. Gruber

*Assistant Examiner*—Edward R. Cosimano

*Attorney, Agent, or Firm*—Michael J. DeSha; William D. Soltow, Jr.; Albert W. Scribner

[57] ABSTRACT

A method and associated apparatus for completing an incomplete trip in an electronic postage meter, comprising the steps of reading the state of bistable member after the trip cycle has commenced, setting a fatal error if the bistable member is in its home state prior to completion of the trip cycle, energizing a drive motor to try to complete the trip cycle, reading the state of the cycle switch, and de-energizing the drive motor after a maximum period of time.

10 Claims, 8 Drawing Figures

ADDRESS BUS
94
DATA BUS
108
CONTROL BUS
96
90
OPTO
SERIAL I/O CHANNEL
92
SYSTEM CLOCK
V2
V5
72
POWER ON RESET
V2
V1
88
LOW VOLTAGE SENSOR
NVM READY
CPU WAIT
TP
CPU
10a
DEVICE SELECT
98
16a
RAM I/O TIMER
TP
SELECT LINES
99
NVM V5 SW
V4
V5
82
V5 SWITCH
76
AC LINE
HOT SW MDV
50
58
FUSE
56
TRANSFORMER
70
V4 REG.
74
V5 REG.
OPTO
TRIAC
54
60
COLD SWITCH
62
SWITCHER
66
V2 FILTER
AC DRIVE MOTOR
36a
48
V2 DISPLAY
V2 LOGIC
52
RFI FILTER
59
PREREGULATOR
V1

COMPLETING AN INCOMPLETE TRIP IN AN ELECTRONIC POSTAGE METER

CROSS REFERENCE TO RELATED APPLICATIONS

The present patent application is related to copending application Ser. No. 447,915, filed on Dec. 8, 1982 in the name of Edward C. Duwel, now U.S. Pat. No. 4,536,850 entitled, MONITORING THE STATUS OF THE TRIP CYCLE IN AN ELECTRONIC POSTAGE METER, and copending application Ser. No. 447,815, filed on Dec. 8, 1982 in the name of Danilo Buan, entitled, STAND-ALONE ELECTRONIC MAILING MACHINE.

BACKGROUND OF THE INVENTION

The present invention relates to electronic postage meters, and more particularly to electronic postage meters of the stand-alone type such as disclosed in aforementioned copending application Ser. No. 447,815, filed on Dec. 8, 1982 in the name of Danilo Buan and entitled, STAND-ALONE ELECTRONIC MAILING MACHINE.

Known electronic postage meters have generally comprised two separate units like their earlier mechanical forerunners i.e., a postage meter and base or mailing machine to enable the postage meter to be physically taken to the post office periodically to charge the meter. Such a meter is disclosed in U.S. Pat. No. 4,301,507, issued on Nov. 17, 1981 and assigned to Pitney Bowes, Inc. of Stamford, Conn. With the advent of remote meter resetting systems, it is no longer necessary that the postage meter be separated into two distinct units since the necessity to take the meter to the post office for recharging has been eliminated. Further, it is desirable to have a self-contained electronic postage meter that includes the metering function as well as all drive mechanisms to reduce the size and weight of the meter as well as making it more economical to produce. The mechanical construction of such a meter is disclosed in detail in the aforementioned patent application entitled, STAND-ALONE ELECTRONIC MAILING MACHINE. With such electronic postage meters, it is desirable to attempt to complete a trip cycle should a malfunction occur during the trip cycle.

There are similarities in the operation of this electronic postage meter and the electronic postage meter disclosed in the aforementioned patent with certain unique exceptions. One such exception is a subroutine for completing an incomplete trip during power up of an electronic postage meter as will be described more fully hereinafter.

SUMMARY OF THE INVENTION

It is an object of the present invention to try to complete an incomplete trip during a trip cycle of an electronic postage meter.

It is a further object of the present invention to try and complete the trip cycle by further initiating a trip.

Briefly, a method and associated apparatus is provided for completing an incomplete trip in an electronic postage meter, comprising the steps of reading the state of a bistable member after the trip cycle has commenced, setting a fatal error if the bistable member is in its home state prior to completion of the trip cycle, energizing a drive motor to try to complete the trip cycle, reading the state of the cycle switch, and de-energizing the drive motor after a maximum period of time.

Other objects, aspects and advantages of the present invention will be apparent from the detailed description considered in conjunction with the preferred embodiment of the invention illustrated in the drawings, as follows:

DETAILED DESCRIPTION

Figure 1:
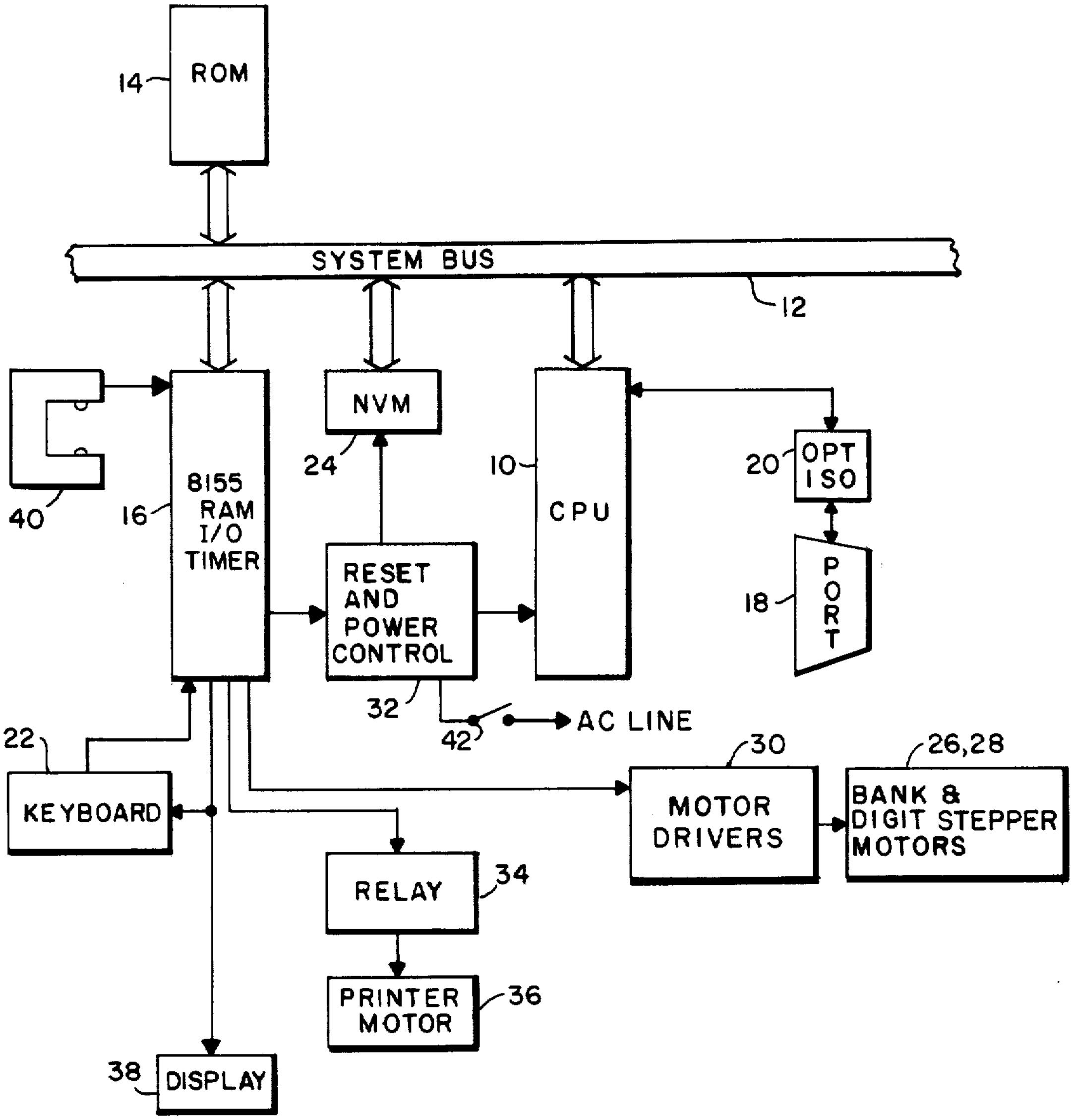
FIG. 1 is a block diagram of the general electronic circuit for an electronic postage meter.
Figure 2A:
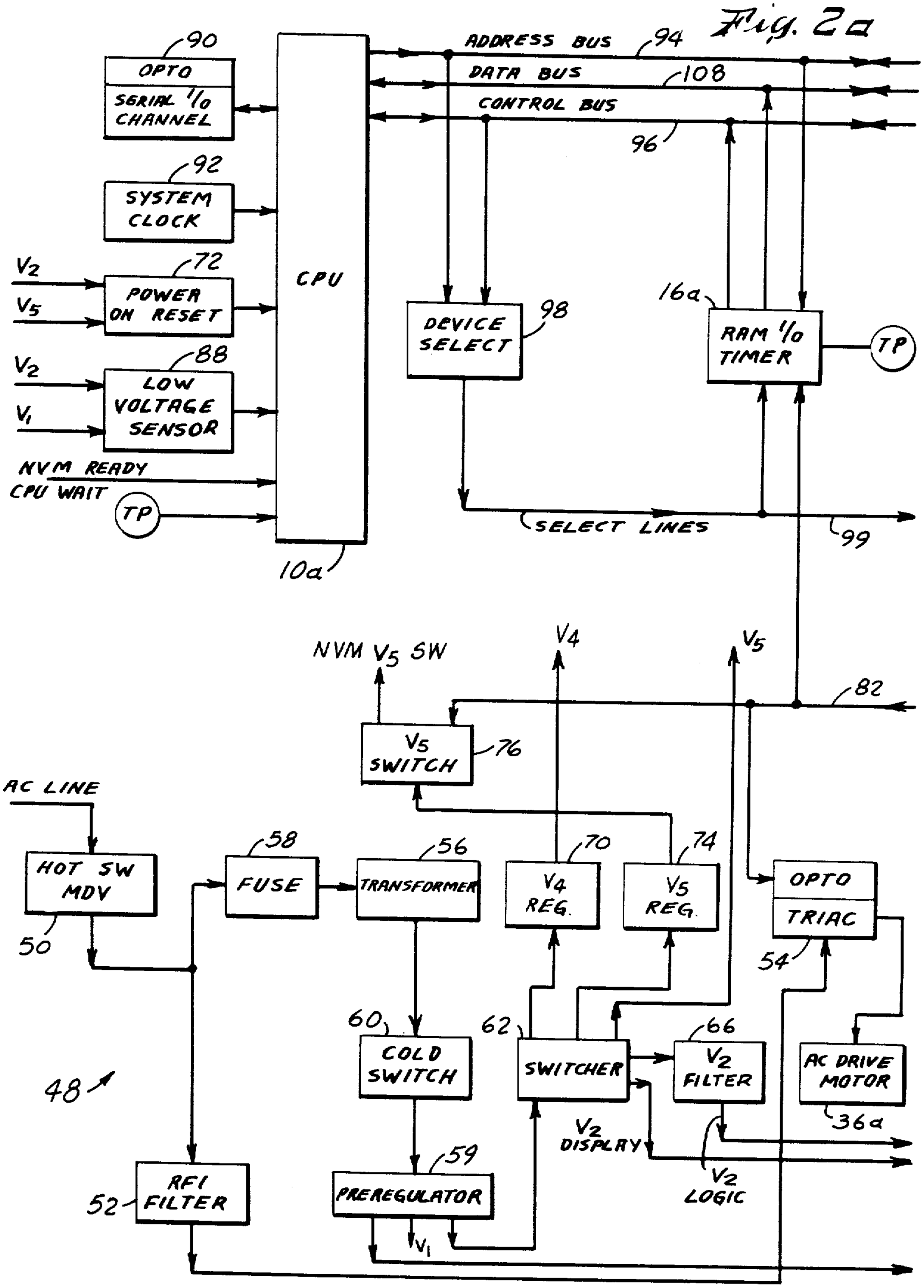
FIGS. 2*a* and 2*b* is a detailed block diagram of the electronic circuitry of an electronic postage meter.
Figure 2B:
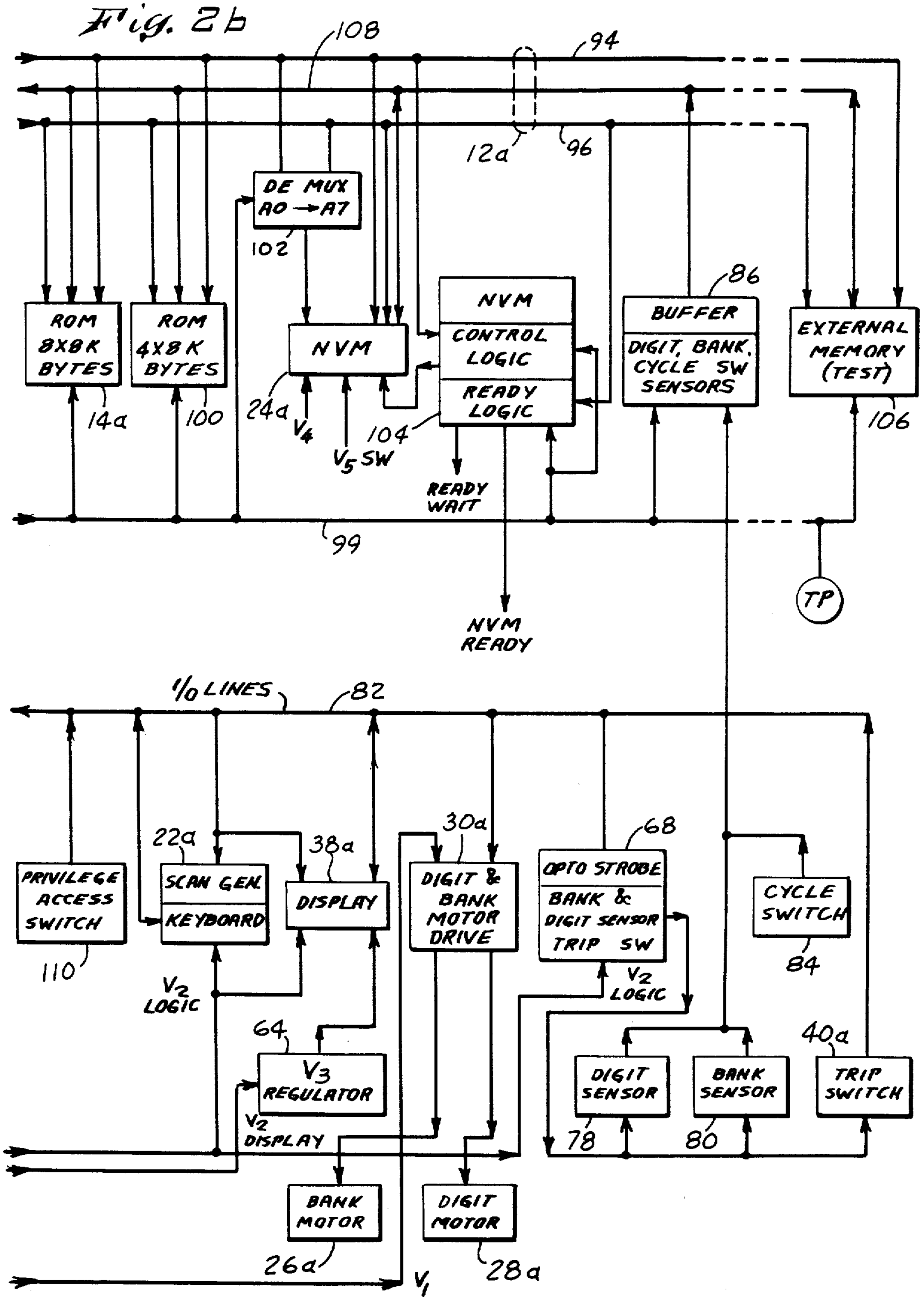

Referring to FIG. 1, the electronic postage meter includes an 8-bit microprocessor 10 (CPU), such as an Intel Model 8085A microprocessor which is connected to various components through a system bus 12. ROM 14 is connected to the microprocessor 10 through the system bus 12. The ROM 14 stores the programs for controlling the postage meter. It should be understood that the term ROM as used herein includes permanently programmed and reprogrammable devices. An integrated circuit 16, which may be Intel Model 8155, is connected to the system bus 12 and includes RAM, input and output lines and a timer. The RAM portion of the integrated circuit 16 has memory space allocated for transient storage of the data for the ascending register and descending register. An external data communication port 18 is connected to the microprocessor 10 through optical isolator 20. The external data communication port 18 allows connection with devices such as an electronic scale, an external computer, servicing equipment and the like. Also electrically connected to the microprocessor 10 through the system bus 12 is the keyboard 22 of the postage meter and a non-volatile memory (NVM) 24. Stepper motors 26, 28 are also in electrical connection with the microprocessor 10 via motor drivers 30 and the integrated circuit 16. A reset and power control 32 is electrically connected between the integrated circuit 16, the NVM 24 and the microprocessor 10. A relay 34 connects the AC printer motor 36 to the integrated circuit 16. A display 38 is also electrically connected to the integrated circuit 16. Trip photosensor 40 is connected to the microprocessor 10 through integrated circuit 16 to indicate the presence of an envelope to be stamped, as described more fully in the aforementioned patent application entitled, STAND-ALONE ELECTRONIC MAILING MACHINE.

The electronic postage meter is controlled by the microprocessor 10 operating under control of the programs stored in the ROM 14. The microprocessor 10 accepts information entered via the keyboard 22 or via the external communication port 18 from external message generators. Critical accounting data and other important information is stored in the non-volatile memory 24. The non-volatile memory 24 may be an MNOS semiconductor type memory, a battery augmented CMOS memory, core memory, or other suitable non-volatile memory component. The non-volatile memory 24 stores critical postage meter data during periods when power is not applied to the postage meter. This data includes in addition to the serial number of the mailing machine or postage meter information as to the value in the descending register (the amount of postage available for printing), the value in the ascending register (the total amount of postage printed by the meter), and the value in the piece count register (the total number of cycles the meter has performed), as well as other types of data, such as trip status, initialization and service information, which are desired to be retained in the memory even though no power is applied to the meter.

When an on/off power switch 42 is turned on (closed) a power supply internal to the mailing machine energizes the microprocessor 10 and the balance of the electronic components. The information stored in the non-volatile memory 24 is transferred via the microprocessor 10 to the RAM of the integrated circuit 16. After power up the RAM contains an image or copy of the information stored in the non-volatile memory 24 prior to energization. During operation of the postage meter, certain of the data in the RAM is modified. Accordingly, when postage is printed, the descending reigster will be reduced by the value of the printed postage, the ascending register increased by the value of the printed postage and the piece counter register incremented. When the power switch 42 is turned off (opened), the updated data in the RAM is transferred via the microprocessor 10 back into a suitably prepared area of the non-volatile memory 24. A like transfer of information between the non-volatile memory 24 and the RAM takes place during power failure.

Referring to FIGS. *2a* and *2b* a more detailed block diagram of the arrangement of the electrical components for the postage meter is illustrated generally as 48. Power is supplied to the postage meter from the AC line voltae, typically 115 volts. This line voltage is applied to the meter through a hot switch 50 which cuts off power to the postage meter to protect the electrical components thereof if the temperature rises above a preset limit, nominally 70° C. The hot switch 50 is connected to the AC drive motor 36A through an RF filter 52 and an opto-triac 54 which provides isolation between the line voltage and the control logic for the meter. The hot switch 50 is also connected to a transformer 56 protected by a fuse 58. The output of the transformer 56 is coupled to a pre-regulator 59 through a cold switch 60. The cold switch 60 cuts off power to the pre-regulator 59 if the temperature drops below a preset limit, nominally 0° C. The pre-regulator 59 provides an output voltage of a predetermined range to a switcher 62 which generates the output voltage +5V; and the voltages for generating −12V and −30V.

The +5V is applied to a +3 volt regulator 64 and then to the display 38A. The +5V from the switcher 62 is also applied to a +5V filter 66 which provides +5V for logic circuits. Specifically, the +5V is applied to the keyboard 22A, the display 38A, and bank, digit and trip sensor logic 68 and to the integrated circuits. The −12V is applied to a −12V regulator 70 and then to the non-volatile memory 24A.

The −30V output from the switcher 62 is also applied to a −30V regulator 74 and then to a −30V switch 76 which switches its output voltage on and off in response to the requirements of writing in NVM as dictated by the program. The output of the −30V switch is applied to the non-volatile memory 24A. The −30V supply is connected to the power on reset 72 of the microprocessor 10A.

+5V from the switcher 62 is also supplied to one input of the power on reset 72; the other input receives −30V from the regulator 74 as previously described. A low voltage sensor 88 also receives one input of +5V from the switcher 62 and its other input from the pre-regulator 59; its output is applied to the microprocessor 10A. The low voltage sensor 88 detects power failure and communicates this to the microprocessor 10A which in turn addresses the RAM through system bus 12A to transfer all security data present in the RAM to the non-volatile memory 24A.

Another output from the pre-regulator 59 in the form of +24V is applied to the digit and bank motor drive 30A for the bank motor 26A and digit motor 28A, which selects the particular printing wheel (bank) which is to be activated and the particular digit of the selected printing wheel which is to be set.

An output strobe from the integrated circuit 16A is buffered through bank, digit and trip sensor logic 68 and applied to digit sensor (encoder) 78, bank sensor (encoder) 80, and trip sensor 40A. The opto strobe applies power to the digit sensor 78, bank sensor 80 and trip sensor 40A when needed. The output from the trip sensor 40A is applied to the input/output lines 82 which are coupled to the integrated circuit 16A. The outputs from the digit sensor 78 and bank sensor 80 and cycle switch 84 are applied to a storage buffer 86. External memory test 106 (shown connected by dotted lines) is utilized to test all of the functions of CPU **10*a*** before the postage meter is put in the field.

During power up, the key switch 42, see FIG. 1, is closed, and the AC line voltage energizes the electrical components previously described and an Initialization process will occur. Such initialization may include a hard and/or soft initialization process as disclosed in the aforementioned U.S. Pat. No. 4,301,507. Preferably the Initialization process is that described in copending application Ser. No. 695,027, filed on Jan. 28, 1985, which is a CIP of Ser. No. 447,913, filed on Dec. 8, 1982 now abandoned, in the name of Alton B. Eckert and Easwaran C.N. Nambudiri entitled, INITIALIZING THE PRINT WHEELS IN AN ELECTRONIC POSTAGE METER, and assigned to the same assignee as the present invention.

In operation, the microprocessor 10A under control of the ROM 14A and possibly the auxiliary ROM 100 communicates over the address bus 94 and control bus 96 with the device select 98. The output of the device select 98 communicates with the particular module to be addressed over select lines 99. The modules to be addressed are the RAM, the ROM 14A, an auxiliary ROM 100, a demultiplexer 102, NVM logic 104 and the buffer 86. The RAM of integrated circuit 16A provides the working memory for the postage meter and the microprocessor 10A. The ROM 14A stores the program; the auxiliary ROM 100 may be used to provide additional program storage space. The non-volatile memory 24A provides storage of all security information for the meter and retains such information during power down or power failure. The demultiplexer 102 latches the lower eight (8) bits of address information that defines a particular location which is used immediately thereafter. The NVM logic 104 controls the mode of operation of the NVM 24A and also provides ready wait and NVM ready signals to the microprocessor 10A to indicate the presence of the slow speed device (NVM) as active on the bus 12A.

As previously mentioned, the digital sensor 78 (optical encoder) and bank sensor 80, (optical encoder) and cycle switch 84 whose current state is read, i.e., "Home" or "In Cycle", apply input signals to the buffer 86 which sends output signals over data bus 108 to the microprocessor 10A for storage in the proper RAM location.

The RAM is also electrically coupled to I/O lines via opto-serial i/O channel 90 to transmit or receive data from the trip sensor 40A, the display 38A, keyboard 22A, and privilege access switch 110, if present. The privilege access switch 110 may be used in applications which require manual resetting of meter postage via a switch which is kept under seal. A system clock 92 is utilized to cycle the CPU 10 on a regular basis.

Figure 3A:
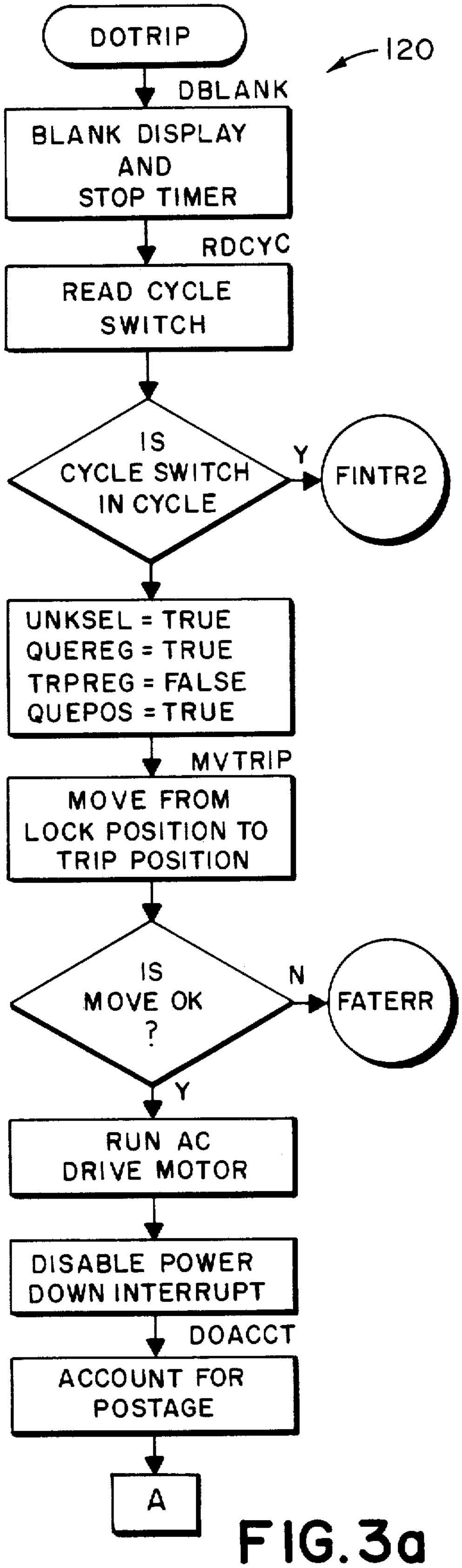
FIGS. 3*a* and 3*b* is a flow chart of a portion of a DOTRIP Routine.
Figure 3B:
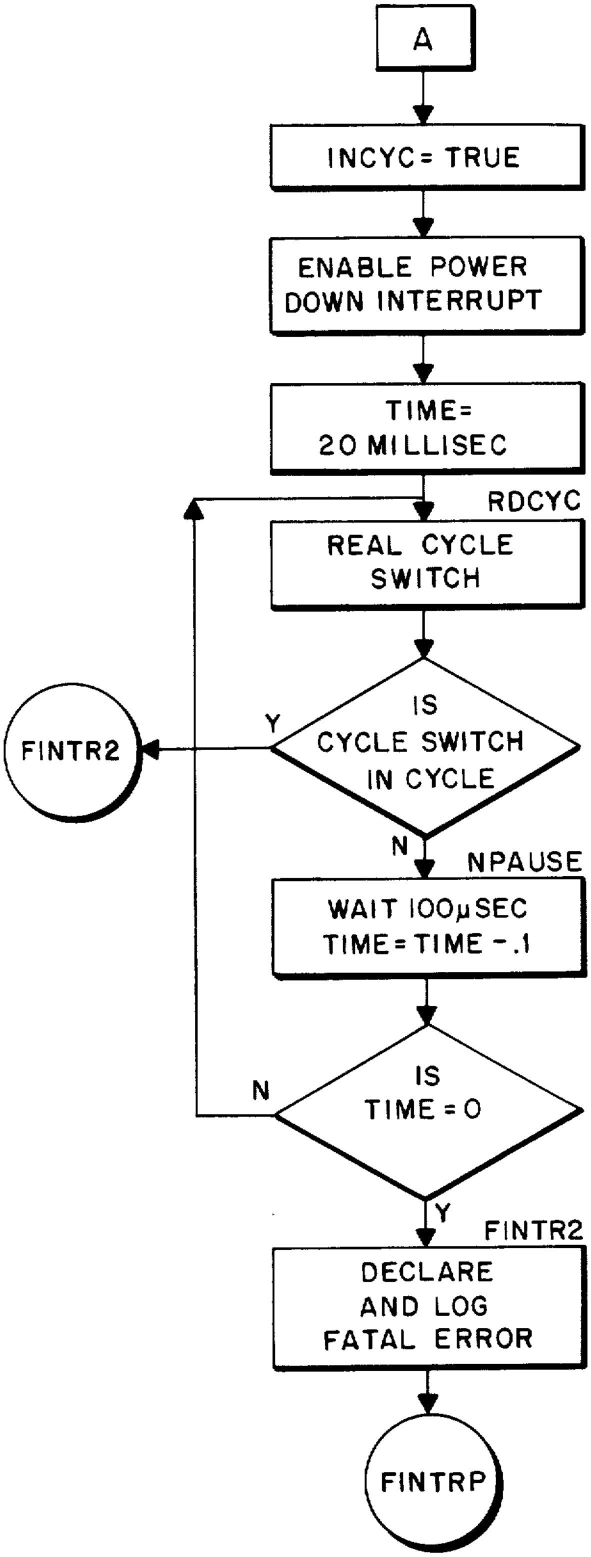

Referring to FIGS. 3a and 3b, a portion of the DOTRIP Routine is illustrated therein as 120. The complete DOTRIP Routine is set forth in the aforementioned relates patent applications.

After the postage meter is properly initialized during power up and desired postage values are set via the keyboard 22A, the postage meter is ready for the trip cycle or the printing of postabe of an envelope. (See the aforementioned patent application entitled INITIALIZING THE PRINT WHEELS IN AN ELECTRONIC POSTAGE METER). To commence a trip an envelope is inserted in the throat of the postage meter. The end of the envelope is sensed by the trip sensor 40A which sends a signal to the RAM which communicates with the mocroprocessor 10A under control of the program in the ROM 14A to begin the trip cycle, illustrated as the DOTRIP Routine 120 in FIG. 3. Additionally, the meter may be tripped by an external trip as disclosed in copending application Ser. No. 447,925, filed on Dec. 8, 1982 in the names of John H. Sodenberg and Edward C. Duwel, entitled CONTROLLING FIRMWARE BRANCH POINTS IN AN ELECTRONIC POSTAGE METER.

When DOTRIP Routine 120 commences, the display 38A is blanked and the timer which provides a blinking display is deactivated. The position of the cycle switch 84 is then read by reading its current state. This current state is then stored in the storage buffer 86 and eventually communicated to the RAM. If the cycle switch is in its "Home" or "off" position, the routine proceeds. However, if the cycle switch is In Cyle (current flowing) FINTR2 sequence occurs and a fatal error is declared and logged by setting a bit in non-volatile memory 24A. The meter is then locked up and rendered non-functional.

If the cycle switch 84 is Home (not in cycle), certain flags or bits are then set. Specifically, the following bits are set:

1. UNKSEL - not certain where the trip mechanism is or if in a postage selection - this is set TRUE. If not set TRUE, i.e., FALSE, nothing mechanically is being done.
2. QUEREG - end of a trip cycle to output extra information - this is set TRUE for a trip and FALSE for no trip.
3. TRPREQ - request has been made for a trip - set FALSE when we start the trip.
4. QUEPOS - at the end of the trip cycle this will result in a postage value message - this is set TRUE. After the trip is completed it is set FALSE.

The UNKSEL and QUEREG bits are transmitted from the RAM 16A to the non-volatile memory 24A. The trip lever 142 of the selection mechanism is then moved under control of the microprocessor 10A from its lock position to its trip position, see FIG. 6. A sensor sends a flag to the microprocessor 10A to indicate whether this movement was accomplished. If it is not accomplished, a fatal error is declared and logged by setting a bit in the non-volatile memory 24A. The meter is then locked up and rendered inoperative.

If the move is okay the AC drive motor is energized and the power down interrupt is disabled so that the postage can be accounted for by undergoing a DOACCT Subroutine similar to that disclosed in the aforementioned U.S. Pat. No. 4,301,507.

In the DOACCT Subroutine, the value of the ascending register in the RAM is increased to the value present in the ascending register plus the preset postage value which was just used in printing postage on an envelope. Thereafter a new cyclic redundancy character (CRC) is computed for the ascending register. The descending register in the RAM is then reduced to the present value in the descending register minus the preset postage value which was just used in printing postage on an envelope. Likewise, a new cyclic redundancy character is computed for the descending register. The value of the piece count register in the RAM is then incremented to the value present in the piece count register plus one (1) to account for the piece of mail just stamped with preset postage. The DOACCT Subroutine is then completed and its completion is reported to the superordinate process, e.g., the DOTRIP. After completion of the accounting Subroutine DOACCT, another flag or bit is set INCYC=TRUE. If INCYC=FALSE, the DOTRIP routine has not progressed far enough to complete the accounting. This INCYC bit is transmitted from the RAM to the non-volatile memory 24A.

After setting INCYC=TRUE, the power down interrupt is then enabled once again. A period is then entered where the cycle switch must change from "Home" indication to "In-Cycle" indication before a predetermined period of time has elasped, e.g., 20 milliseconds. If this time period expires and the cycle switch still yields a "Home" indication, a fatal error is declared and stored in non-volatile memory 24A and the remainder of the trip is attempted to be completed by procedure FINTRP.

Figure 4:
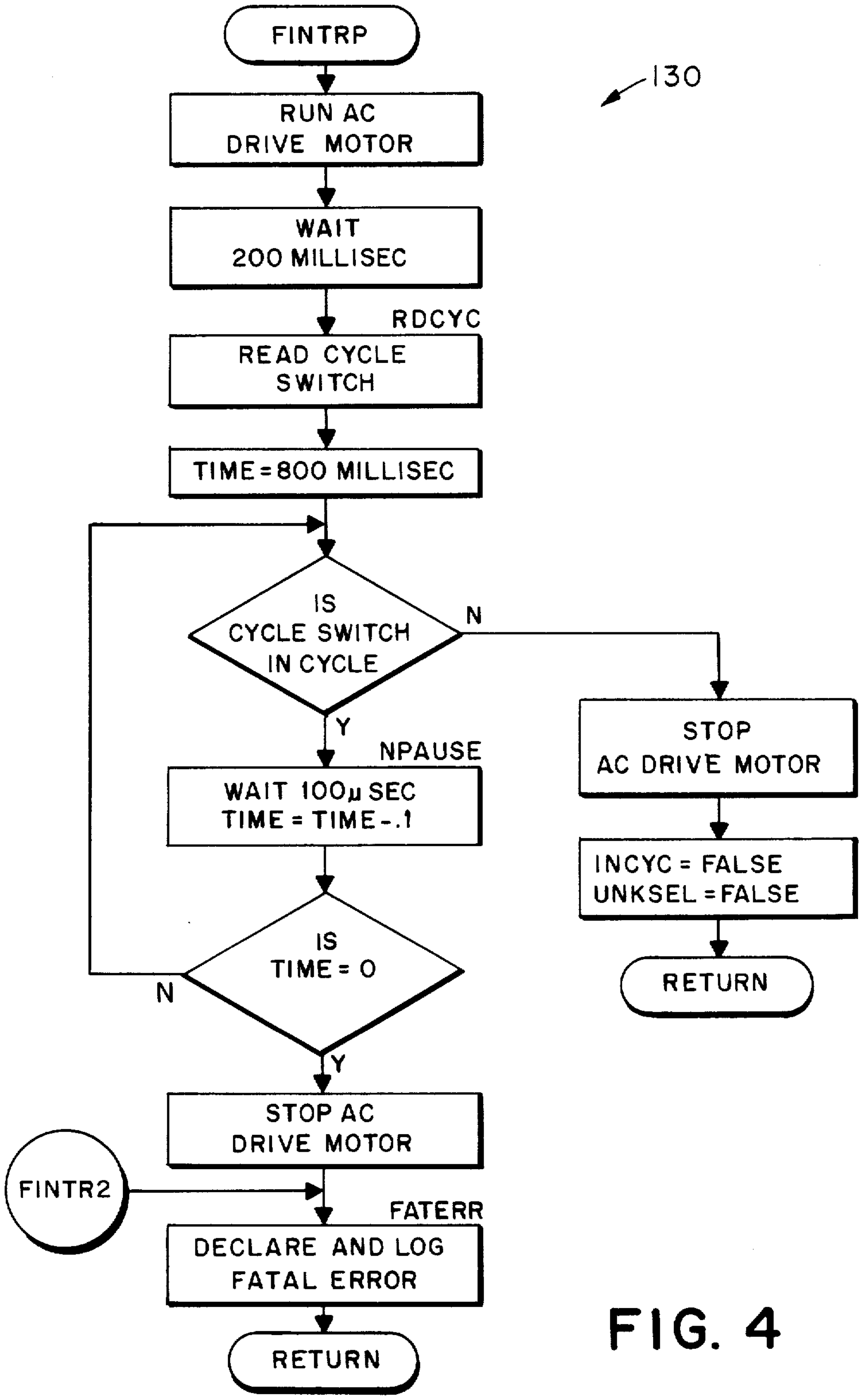
FIG. 4 is a flow chart of the FINTRP Subroutine of the present invention.

Referring to FIG. 4, the FINTRP Routine 130, the AC drive motor 36A is activated. After 200 milliseconds the cycle switch 84 is read. If the cycle switch 84 is Home, the AC drive motor is de-energized, INCYC set FALSE, UNKSEL set FALSE and normal status is returned to the executive. If the cycle switch 84 is In Cycle, the cycle switch 84 is read every 100 millisec for a maximum period of 800 millisec.

If during this period the cycle switch 84 is Home, the AC drive motor 36A is deactivated INCYC set FALSE, UNKSEL set FALSE and normal status is returned to the executive. If the cycle switch 84 is still In Cycle at the end of the 800 millisec., the AC drive motor is de-energized and a fatal error is declared and logged in the NVM 24A and error status is returned to the superordinate process.

From the foregoing description, it is apparent that the subroutine of the present invention provides for completion of the trip cycle in those situations where the cycle switch has stopped (is Home) during the trip cycle (incomplete trip). If the trip cycle is properly completed, further trips may be undertaken.

However, if the trip cycle cannot be properly completed after repeated attempts during power up, a fatal error is declared and stored in a particular address of the NVM 24A, effectively locking up the postage meter and rendering it inoperative. However, if during each power up the trip mechanism is moved some small amount toward completion of the trip cycle, after several power-up cycles, the trip will be completed and the meter will again be fully functional.

Figure 5:
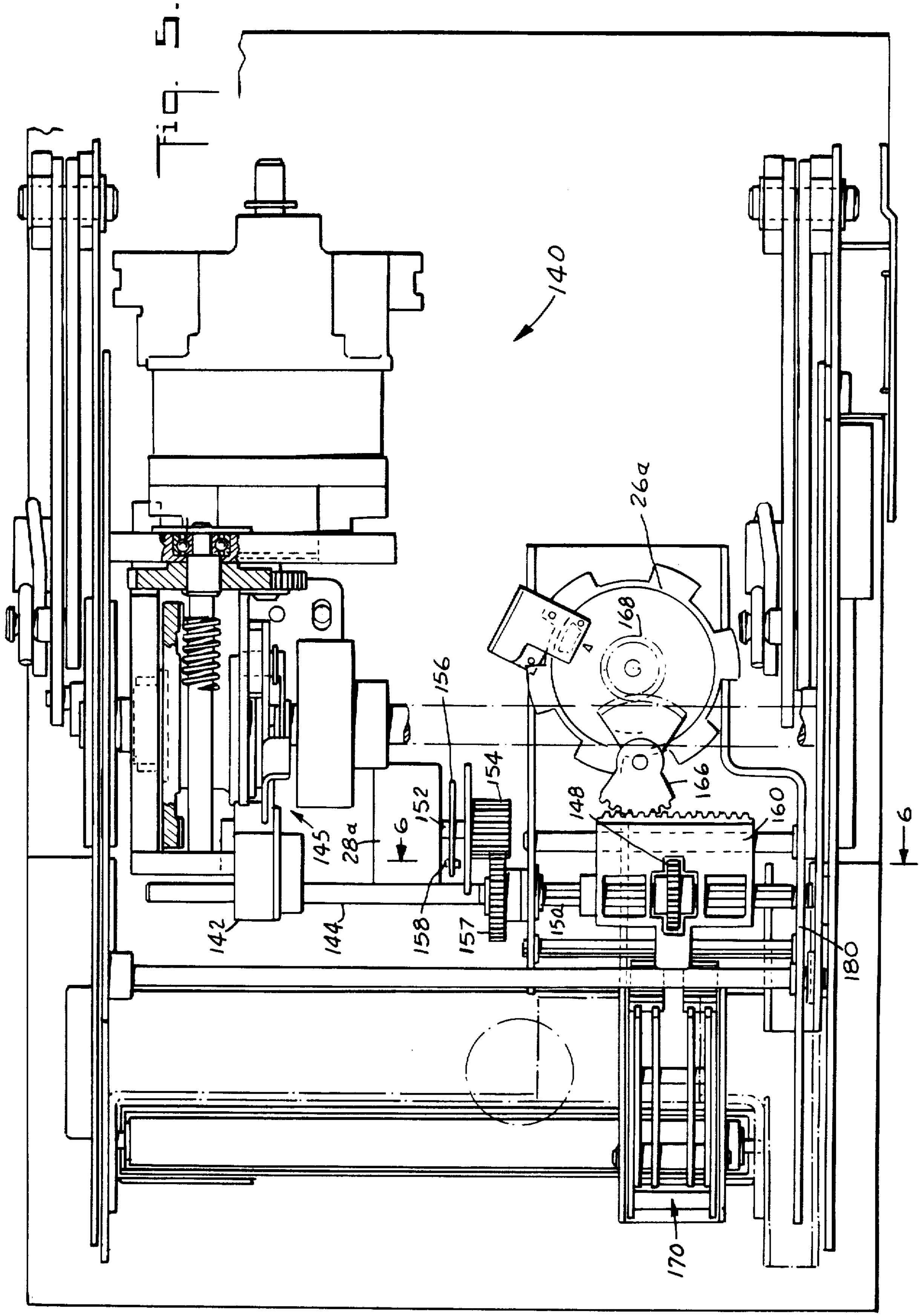
FIG. 5 is a top plan view of the trip selection mechanism of an electronic postage meter.
Figure 6:
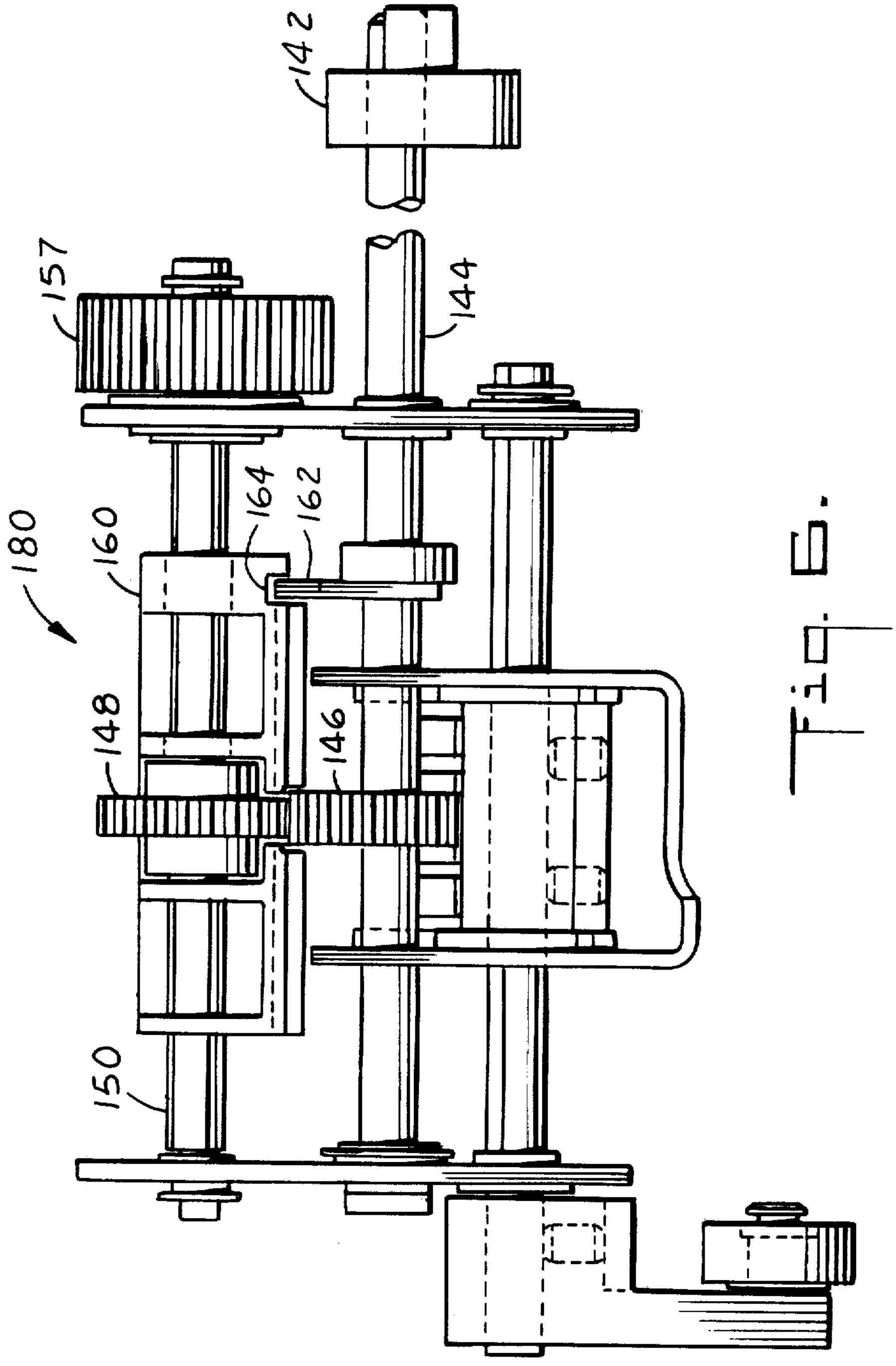
FIG. 6 is a top plan view of the locking mechanism of the electronic postage meter.

Referring to FIGS. 5 and 6, the trip selection mechanism for an electronic postage meter of the type disclosed in the aforementioned copending patent application entitled, STAND-ALONE ELECTRONIC MAILING MACHINE, is illustrated generally as 140 and 180, respectively. Further, details regarding the trip selection mechanism and the other mechanical components of such an electronic postage meter may be obtained from said aforementioned patent application, the disclosure of which is incorporated by reference as previously noted. The trip selection mechanism 140 includes a trip lever 142 affixed to a rotatable trip shaft 144 adjacent to one end thereof for engagement and disengagement with a clutch 145. The trip shaft 144 also includes a gear 146 affixed thereto for engagement with and rotation by a gear 148 affixed to a tri-lobed shaft 150. A stepper motor 28A includes an output shaft 152 having a gear 154 and an optical encoder disk 156 (not to scale) mounted on the output shaft 152. The optical encoder disk 156 is received within a sensor 158 so that the position of the stepper motor shaft 152 can be determined. The gear 154 engages a gear 157 affixed to the tri-lobed shaft 150. The gear 148 is disposed within an opening of a carriage 160.

In operation, as seen in FIGS. 5 and 6, the stepper motor 28A is energized to rotate the stepper motor gear 154 and the gear 157 affixed to the tri-lobed shaft 150. The tri-lobed shaft 150 rotates gear 146 affixed to the trip shaft 144 which in turn rotates gear 146 which is affixed to the trip lever shaft 144. The gear 146 is thereby rotated out of engagement with the carriage slot 164, thereby freeing the carriage 160 for movement along the tri-lobed shaft 150. As shown in FIGS. 5 and 6, the trip shaft 144 and trip lever 142 are in their home or middle position. The down position of the trip lever 142 is the set position. The up position of the trip lever 142 is the trip position. In the middle or intermediate position of the trip lever 142, as shown in FIG. 6, a locked condition exists. Rotation of the trip lever 142 to the set position disengages the locking lever 162 from the carriage slot 164 and allows movement to be imparted to the carriage 160 in either direction along the tri-lobed shaft 150 for selecting the appropriate bank of the print wheels (not shown) in response to energization of bank stepper motor 26A which moves gear 166 via stepper motor gear 168. The individual digit of the desired print wheel is then selected by the stepper motor 28A which rotates the tri-lobed shaft 150 and thus gear 148 which is engageable with the teeth of a selected one of four print wheel racks 170.

It is known and understood for the purpose of the present application that the term postage meter refers to the general class of device for the imprinting of a defined unit value for governmental or private carrier delivery of parcels, envelopes or other like application for unit value printing. Thus, although the term postage meter is utilized, it is both known and employed in the trade as a general term for devices utilized in conjunction with services other than those exclusively employed by governmental postage and tax services. For example, private, parcel and freight services purchase and employ such meters as a means to provide unit value printing and accounting for individual parcels.

It should be understood by those skilled in the art that various modifications may be made in the present invention without departing from the spirit and scope thereof, as described in the specification and defined in the appended claims.

What is claimed is:

1. A method for completing an incomplete trip in an electronic postage meter, comprising the steps of:
- reading the state of a bistable member after the trip cycle has commenced;
- setting a fatal error if the bistable member is in its Home state prior to completion of the trip cycle;
- energizing a drive motor to try to complete the trip cycle;
- reading the state of the bistable member;
- de-energizing the drive motor after a selected maximum period of time.

2. The method recited in claim 1, wherein:
- the selected maximum period of time for energization of the drive motor is approximately one (1) second.

3. The method recited in claim 1, including the steps of:
- reading the state of the bistable member after a predetermined period of time;
- continuing to read the state of the bistable member during subsequent time intervals until the selected maximum period of time is reached.

4. The method recited in claim 3, including:
- setting a fatal error bit in a non-volatile memory if the bistable member is still in cycle after the final reading thereof.

5. A method for completing an incomplete trip in an electronic postage meter, comprising the steps of:
- reading the state of a bistable member after the trip cycle has commenced;
- setting the fatal error if the bistable member is in its Home state prior to completion of the trip cycle;
- energizing a drive motor to try to complete the trip cycle;
- reading the state of the bistable member after the drive motor has been energized;
- de-energizing the drive motor if the bistable member is Home;
- running the drive motor for a selected maximum period of time while reading the bistable member during specified intervals if the bistable member is in an in Cycle state;
- de-energizing the drive motor prior to the end of the maximum period of time if the state of the bistable member is a Home state; and
- setting a fatal error if the bistable member is still In Cycle after the expiration of the selected maximum period of time.

6. Apparatus for completing an incomplete trip in an electronic postage, meter comprising:
- a bistable member having In Cycle and Home states;
- means for reading the state of said bistable member after the trip cycle has commenced;
- non-volatile memory means;
- address means for setting a fatal error bit in said non-volatile memory means if said bistable member is in its Home state prior to completion of the trip cycle;

means for energizing a drive motor in an attempt to complete the trip cycle;

said reading means reading the state of said bistable member; and means for de-energizing said drive motor after a selected maximum period of time has elapsed.

7. The apparatus recited in claim 6, including:

delay means for delaying a predetermined period of time after activation of said energizing means before reading said bistable means.

8. The apparatus recited in claim 6, wherein:

said means for de-energizing said drive motor de-energizes the same if said bistable member is in its Home state prior to the expiration of the selected maximum period of time.

9. The apparatus recited in claim 6, wherein:

said means for de-energizing said drive motor de-energizes the same after the selected maximum period of time has elapsed if said bistable member is still In Cycle.

10. An apparatus for completing an incomplete trip in an electronic postage meter, comprising:

a bistable member having In Cycle and Home states;

means for reading the state of said bistable member after the trip cycle has commenced;

non-volatile memory means for storing data;

address means for storing a fatal error bit in said non-volatile memory if said bistable member is in its Home state during the trip cycle;

means for energizing a drive motor in an attempt to complete the trip cycle;

said reading means reading the state of the bistable member subsequent to the energization of said drive motor;

means for de-energizing said drive motor after reading of the state of said bistable member by said reading means if said bistable member is in its Home state; and means for setting a fatal error bit in said non-volatile memory means after a predetermined maximum time period if said member is still its In Cycle state.

* * * * *

UNITED STATES PATENT AND TRADEMARK OFFICE
CERTIFICATE OF CORRECTION

PATENT NO. : 4,628,476

DATED : December 9, 1986

INVENTOR(S) : Edward C. Duwel

It is certified that error appears in the above-identified patent and that said Letters Patent is hereby corrected as shown below:

Column 3, line 39, delete "voltae," and insert --voltage,--.

Column 5, line 25, delete "postabe" and insert --postage--.

Signed and Sealed this

Tenth Day of January, 1989

*Attest:*

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,628,476

DATED : December 9, 1986

INVENTOR(S) : Edward C. Duwel

It is certified that error appears in the above-identified patent and that said Letters Patent is hereby corrected as shown below:

Column 5, line 21, delete "relates patent applications." and insert --related patents 4,536,850 and 4,579,054.--

Signed and Sealed this

First Day of August, 1989

*Attest:*

DONALD J. QUIGG

*Attesting Officer*

*Commissioner of Patents and Trademarks*